United States Patent
Cohen et al.

(10) Patent No.: US 7,881,617 B2
(45) Date of Patent: Feb. 1, 2011

(54) BUFFERING SCHEMES FOR OPTICAL PACKET PROCESSING

(75) Inventors: Earl T. Cohen, Oakland, CA (US); Garry Epps, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 741 days.

(21) Appl. No.: 11/410,566

(22) Filed: Apr. 24, 2006

(65) Prior Publication Data

US 2007/0201870 A1   Aug. 30, 2007

Related U.S. Application Data

(63) Continuation-in-part of application No. 11/361,770, filed on Feb. 24, 2006.

(51) Int. Cl.
    H04B 10/00   (2006.01)
(52) U.S. Cl. .......................... 398/154; 398/155
(58) Field of Classification Search .................. 398/54, 398/84, 87, 102, 154
    See application file for complete search history.

(56) References Cited

U.S. PATENT DOCUMENTS

| | | | | |
|---|---|---|---|---|
| 4,677,618 A | * | 6/1987 | Haas et al. | 714/700 |
| 5,032,010 A | * | 7/1991 | Su | 359/241 |
| 5,319,484 A | * | 6/1994 | Jacob et al. | 398/75 |
| 5,469,284 A | * | 11/1995 | Haas | 398/54 |
| 5,497,261 A | * | 3/1996 | Masetti | 398/154 |
| 5,506,712 A | * | 4/1996 | Sasayama et al. | 398/47 |
| 5,526,156 A | * | 6/1996 | Bostica et al. | 398/54 |
| 5,535,032 A | * | 7/1996 | Bottle | 398/151 |
| 5,617,233 A | * | 4/1997 | Boncek | 398/51 |
| 6,137,610 A | * | 10/2000 | Patrick | 398/154 |
| 6,144,786 A | * | 11/2000 | Chethik | 385/24 |
| 6,239,892 B1 | * | 5/2001 | Davidson | 398/154 |
| 6,262,823 B1 | | 7/2001 | Nowatzyk | |
| 6,288,808 B1 | * | 9/2001 | Lee et al. | 398/49 |
| 6,437,889 B2 | | 8/2002 | Davidson | |
| 6,535,661 B2 | * | 3/2003 | Takahashi et al. | 385/15 |
| 6,619,867 B1 | | 9/2003 | Asahi | |
| 6,690,891 B1 | * | 2/2004 | Le Sauze et al. | 398/154 |

(Continued)

FOREIGN PATENT DOCUMENTS

WO   2007106177   9/2007

OTHER PUBLICATIONS

Xu et al., Techniques for optical packet switching and optical burst switching, IEEE Communications Magazine, Jan. 2001, pp. 136-142, v. 39, issue 1, New York, U.S.A. (http://www.comsoc.org/ci/private/2001/jan/pdf/xu.pdf).

(Continued)

*Primary Examiner*—Agustin Bello
(74) *Attorney, Agent, or Firm*—Stolowitz Ford Cowger LLP

(57) ABSTRACT

An optical packet processor includes one or more optical packet inputs that receive asynchronous optical packets. An optical packet interconnect directs the optical packets from the different optical packet inputs to different optical packet outputs. The optical packets are buffered either before or after being directed from the inputs to the different outputs. Problems associated with optical buffering are overcome by synchronizing the asynchronous optical packets with the optical packet buffers. The novel optical buffer architectures described also reduce or eliminate the use of certain high cost optical components.

35 Claims, 13 Drawing Sheets

U.S. PATENT DOCUMENTS

| | | | |
|---|---|---|---|
| 6,775,343 | B1 | 8/2004 | Gambini et al. |
| 6,778,536 | B1 | 8/2004 | Ofek et al. |
| 6,957,018 | B2 | 10/2005 | Araki et al. |
| 7,177,544 | B1* | 2/2007 | Wada et al. ............... 398/51 |
| 7,305,186 | B2* | 12/2007 | Islam ...................... 398/51 |
| 7,313,329 | B2* | 12/2007 | Yoo et al. ................. 398/58 |
| 7,428,383 | B2* | 9/2008 | Maciocco et al. .......... 398/45 |
| 2002/0080450 | A1* | 6/2002 | Hait ...................... 359/158 |
| 2003/0095312 | A1* | 5/2003 | Zami et al. .............. 359/158 |
| 2005/0041970 | A1* | 2/2005 | Harai ..................... 398/51 |
| 2006/0008273 | A1 | 1/2006 | Xue et al. |

OTHER PUBLICATIONS

Hunter, David K., "Optical Packet Switching—Tutorial for WAON '98", Dept. of Electronic and Electrical Engineering, University of Strathclyde, May 1998.

Ganesan, Kalpana, "Optical Packet Switching: Advances and Contention Resolution", CSCE 990 Networks Systems Seminar, Feb. 26, 2002, Microsoft® PowerPoint® presentation, 22 pages.

"Contention Resolution using Delay-lines", Introduction, http://www.stanford.edu/cord.html, last updated Apr. 16, 2003, 2 pgs.

NTT Photonics Laboratories, "Optical packet synchronization in optical layer", Jul. 15, 2003, 1 pg.

Ku, Pei-Cheng, et al.,"Variable optical buffer using slow light in semiconductor nanostructures", Proceedings of the IEEE, vol. 91, No. 11, Nov. 2003, 31 pages.

Takahashi, Ryo, "Recent Progress in Optical Packet Processing Technologies for Optical Packet-switched Networks", NTT Technical Review, vol. 2, No. 7, Jul. 2004, pp. 12-22.

International Search Report for PCT/US06/060229; Date of mailing Oct. 15, 2007; ISA/US.

International Preliminary Report on Patentability and Written Opiion of the ISA for PCT/US06/060229; Date of mailing Oct. 15, 2007; ISA/US.

Stolowitz Ford CowGer LLP, Listing of Related Cases, Aug. 12, 2009.

* cited by examiner

BUFFERING SCHEMES FOR OPTICAL PACKET PROCESSING

This application is a continuation in part of co-pending patent application Ser. No. 11/361,770, filed Feb. 24, 2006, entitled: OPTICAL DATA SYNCHRONIZATION SCHEME which in herein incorporated by reference.

BACKGROUND

Optical packet switches and routers process optical packets in an optical domain. Optically switching packets presents challenges that often do not exist in electronic packet switching equipment. For example, packets can arrive asynchronously on various input ports on the packet switching device. In an electronic router, the data is synchronized relatively easily with a local clock domain within a framer/Media Access Control (MAC) device or similar link interface. For instance, the asynchronously arriving packets can be stored in a First In First Out (FIFO) buffer while waiting to be queued for subsequent packet processing.

Unfortunately, equivalent elastic buffering elements do not currently exist in optical switching architectures. Existing optical buffering elements also do not provide the same scale of buffering currently provided in electronic integrated circuitry. Present optical buffers are also synchronous in that the time difference between when data enters and leaves is a fixed delay.

There are two basic techniques currently used to avoid packet contention at optical switch convergence points. One technique uses some type of delay and the second technique uses some type of avoidance, such as shifting to different wavelengths. The avoidance schemes, as the name suggests, avoid the contention problem but only work to a limited scale.

The delay schemes use an optical packet "aligner" circuit on each path to the convergence point. The packet aligners simply delay the incoming signal on each path by a preconfigured constant amount. Unfortunately, it is difficult to control the aligner circuits for each packet on each path. Further, these delay schemes do not take into account asynchronously arriving packets and therefore do not have the capacity to synchronize asynchronous packets with synchronous optical convergence points, such as optical buffers.

The physical characteristics of optical buffers currently limit applications for optical packet processors. The present invention addresses these and other problems associated with the prior art.

SUMMARY OF THE INVENTION

An optical packet processor includes one or more optical packet inputs that receive asynchronous optical packets. An optical packet interconnect directs the optical packets from the different optical packet inputs to different optical packet outputs. The optical packets are buffered either before or after being directed from the inputs to the different outputs. Problems associated with optical buffering are overcome by synchronizing the asynchronous optical packets with the optical packet buffers. The novel optical buffer architectures described also reduce or eliminate the use of certain high cost optical components.

The foregoing and other objects, features and advantages of the invention will become more readily apparent from the following detailed description of a preferred embodiment of the invention which proceeds with reference to the accompanying drawings.

DETAILED DESCRIPTION

Packet processing trade-offs typically considered when designing traditional electronic routing architectures may not be applicable when designing optical packet processing architectures. For example, packet processing architectures trade off the cost, complexity, and size of any required buffering. However, as described above, optical buffers, such as Optical Random Access Memory (ORAM), may constitute a much different tradeoff decision when designing optical packet processing architectures. Other optical tradeoffs include the expense of any global synchronization logic (usually electrical).

Depending on the scale of the router, the "cost" of global synchronization might be in the form of additional signal skew, which translates into a greater need for guard-banding and lower performance. However, this global synchronization still may be relatively less costly than optical architectures that require more optical buffering. Other design tradeoffs may include the cost vs. the complexity of using optical components such as packet detectors, Array Waveguide Grating Routers (AWGRs), etc. Another tradeoff that may be different for optical vs. electrical packet processors may include where, when and how packet routing and/or packet drop decisions are made.

Several buffering schemes are described below that take into account these optical tradeoff considerations. The preferred optical packet processing architecture or the use of the particular novel features used in any of these architectures may depend on the costs of the various optical components or the particular packet processing applications.

Output Queued Architectures

Figure 1:
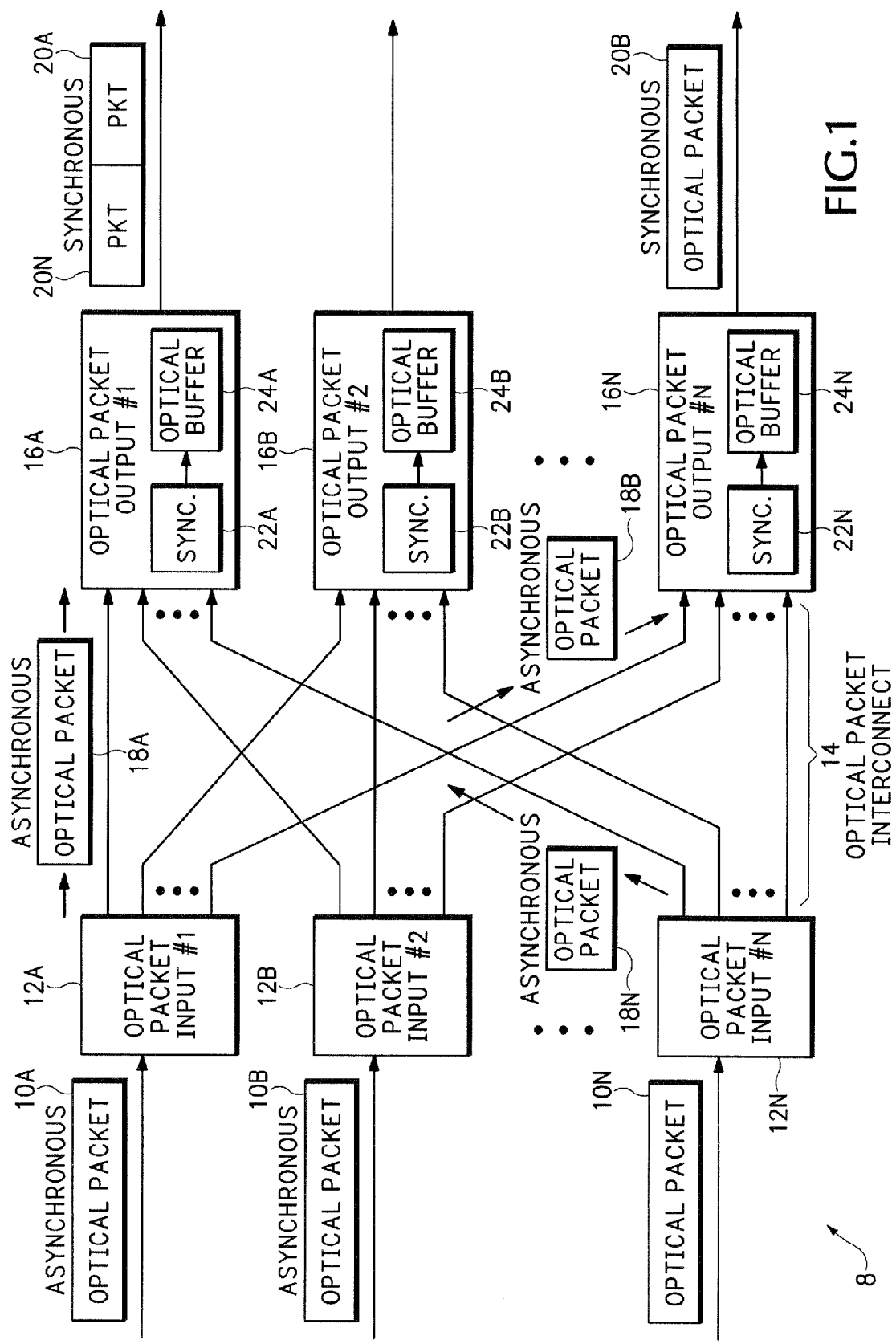
FIG. 1 is a block diagram of an output queued optical packet processing architecture.

FIG. 1 shows an optical packet processor 8 that uses an output queued architecture that spreads packets from different inputs to multiple different outputs. In this particular architecture, multiple different optical packet inputs 12A-12N receive asynchronous optical packets 10A-10N, respectively. It should be understood that the reference letter "N" is used below to represent an integer variable that may vary. In other words, the number of N components shown in the embodiments below may vary depending on the particular application. In particular, the use of N for both of the number of inputs and outputs should not be considered a limitation, and construction of optical routers with N inputs and M outputs according to the teachings herein is within the scope of this invention.

The optical packets 10 are optically processed by the optical packet inputs 12A-12N and output as optical packets 18A-18N, respectively, over an optical packet interconnect 14.

The optical packet interconnect 14 directs the optical packets 18 to different optical packet outputs 16A-16N that may be associated with a destination address contained in an optical packet header or associated with other information contained in the optical packets 10. The optical packets 18A-18N are further processed by the optical packet outputs 16A-16N and then output as optical packets 20A-20N.

In one embodiment, the optical packets 10 received at the optical packet inputs 12 are asynchronous. In one embodiment, the optical packets 18 directed over the optical packet interconnect 14 remain asynchronous in that they are not synchronized with any synchronous optical packet circuitry in the optical packet processor 8. After being directed over the interconnect 14, the asynchronous optical packets 18 are synchronized with the optical buffers 24A-24N by optical packet synchronizers 22A-22N, respectively, prior to being written into the optical buffers 24A-24N. The buffered optical packets 20A-20N are then output from the associated optical packet outputs 16A-16N.

Note that in one embodiment, the synchronization is local and unique for each optical packet output 16. In an alternative embodiment described below, the synchronizers 22 are located in the optical packet inputs 12 and the optical packets 18 are already synchronized with the optical buffers 24 prior to being sent over interconnect 14.

In one embodiment, the optical packet inputs 12 may be input line cards that are connected to an optical packet network. Similarly, the optical packet outputs 16 may be output line cards that are connected to an optical packet network, which may be the same as or different from the input optical network. However, that is just one example. Alternatively, the optical packet inputs 12 may be input ports or some receiving interface in a larger packet processing system. Similarly, the optical packet outputs 16 may be output ports or output interfaces that output the optical packets 20 to other packet processing circuitry that further process the optical packets prior to being output to an optical network.

Figure 2:
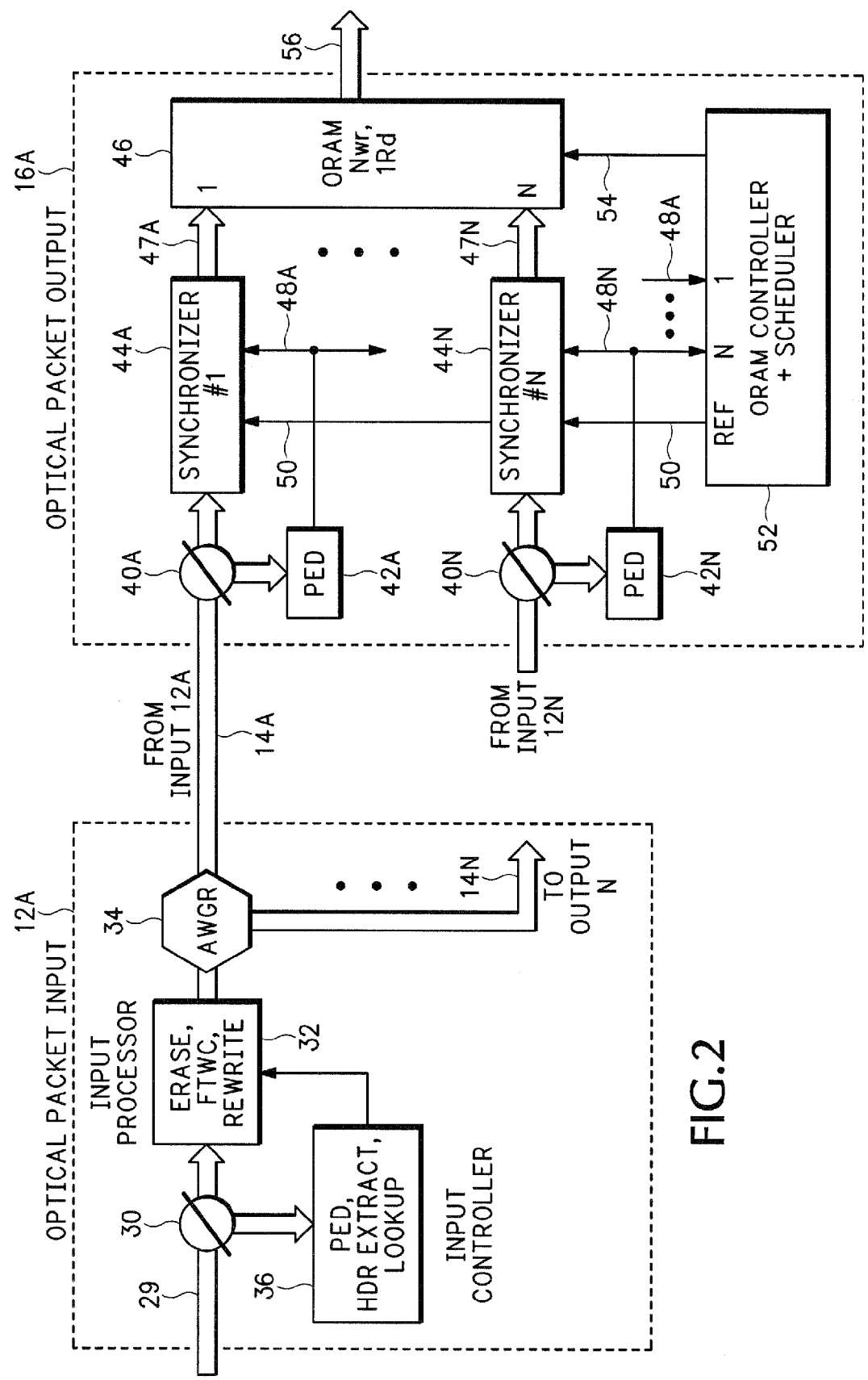
FIG. 2 is one embodiment of the optical packet processing architecture shown in FIG. 1 that uses an Array Waveguide Grating Router (AWGR) interconnect.

FIG. 2 shows one example of the output queued architecture in FIG. 1 that uses wavelength converters and waveguide routers to direct optical packets from the optical packet inputs 12 to different optical packet outputs 16. FIG. 2 only shows one optical packet input 12A and one optical packet output 16A. However, it should be understood that the number of inputs 12 and outputs 16 can vary depending on the application. Accordingly, the input 12A may be referred to generally as input 12, output 16A may be referred to generally as output 16, and interconnect 14A referred to generally as interconnect 14. In some of the following figures, the wide paths reflect optical packet data paths and the narrow single line paths refer to the electrical signal paths that are used to send electronic control information.

Optical Packet Inputs

In this example, the optical packet inputs 12 include an optical packet splitter 30 that directs optical packets received on port 29 both to an input controller 36 and an input processor 32. The input controller 36 includes a Packet Envelope Detector (PED) that detects the beginning, and possibly the end, of the optical packets received on input port 29. In one embodiment, a header in the optical packet detected by the PED may be modulated at a different bit rate than the payload. However, this is just one example. Input controller 36 may also include header extraction logic that causes the input processor 32 to erase the optical packet header and rewrite a new header associated with for example, a destination address.

The input controller 36 may also conduct a table lookup using an address or label contained in the packet header or other location in the optical packet. The table lookup may identify one of the outputs 16 associated with the address or label, and also identify the new label for adding to the optical packet. The input controller 36 is then used for directing the input processor 32 to convert the optical packet to an optical wavelength associated with the identified output 16 and optionally rewrite a new packet header containing the identified destination. The input controller 36 can use any combination of optical and electronic logic and can provide any combination of the packet control operations described above.

The input processor 32 may provide header erasing that erases the detected optical packet header and may include a Fast Tunable Wavelength Converter (FTWC) that converts the optical packet to an optical wavelength associated with one of the optical packet outputs 16 identified by input controller 36. The input processor 32 may also rewrite another header to the optical packet that is associated with the packet destination. In some embodiments, the header erasing and rewriting might be provided at the optical packet outputs 16.

The optical packet with the converted optical wavelength is sent to an Array Waveguide Grating Router (AWGR) 34 that makes up part of the optical packet interconnect 14. The AWGR 34 outputs the optical packet on one of the optical packet interconnects 14 corresponding with the converted wavelength. For example, the AWGR 34 may output optical packets having a first optical wavelength $\lambda_1$ over interconnect 14A to optical packet output 16A. Similarly, optical packets having another optical wavelength $\lambda_N$ are directed over interconnect 14N to optical packet output 16N (FIG. 1).

Optical Packet Outputs

In FIG. 2, the optical packet outputs 16 include an Optical Random Access Memory (ORAM) 46 that includes N write inputs (Nwr) 47A-47N each associated with a different optical packet input 12A-12N, respectively, and one read output (1Rd) 56. For example, write input 47A receives optical packets from optical packet input 12A and input 47N receives optical packets from optical packet input 12N, etc. Example embodiments of the ORAM are described in more detail below.

Each ORAM input 47 is connected to an associated optical packet synchronizer 44 that synchronizes the asynchronously received optical packets with a time reference or phase associated with the ORAM 46. An optical packet splitter 40 directs the asynchronous optical packets received over the interconnect 14 to both the synchronizer 44 and an associated PED 42. The PED 42 provides asynchronous optical packet time reference information 48 to the synchronizer 44. The synchronizer 44 uses the optical packet time information 48 along with an ORAM time reference 50 to synchronize the asynchronous optical packets received over interconnect 14 with the phase of ORAM 46.

A local output controller 52 is associated with each optical packet output 16 and provides the ORAM time reference signal 50 to the different synchronizers 44A-44N. The output controller 52 also operates as a scheduler and uses ORAM control signals 54 to schedule when optical packets are read out of the ORAM 46. In this embodiment, the output controller 52 is notified of incoming optical packets from optical packet detect signals 48 generated by the PEDs 42A-42N, respectively.

The output controller 52 uses any type of priority or arbitration scheme to determine the order that optical packets are output from ORAM 46. For example, different optical packet inputs 12 may have different priorities, or priority may be determined by the input PED 42 as part of or as a function of the packet header detection and processing. Alternatively, or in addition, priority may be based on the number of packets each optical packet input 12 has queued in ORAM 46. In another embodiment, the output controller 52 may operate as an arbiter that determines when optical packets from synchronizers 44A-44N are written into the ORAM 46.

Depending on the particular embodiment of the ORAM 46, output controller 52 may also determine where in the ORAM the optical packets are written. Techniques for memory management of buffers, including allocating buffers when packets arrive and freeing buffers for re-use when they are sent, are well known in the art and are therefore not described in further detail. The properties of the ORAM may allow for some minor improvements in storage efficiency, since in some ORAM embodiments, a location may be written at the same time as it is being read.

The operation of the synchronizers 44A-44N, the associated PEDs 42A-42N, the input controller 36, and the input processor 32 are all described in co-pending patent application Ser. No. 11/361,770, filed Feb. 24, 2006, entitled: OPTICAL DATA SYNCHRONIZATION SCHEME which in herein incorporated by reference. According, these elements will not be described in further detail.

The optical processing architecture shown in FIG. 2 allows optical packets from different inputs 12 to be received and buffered at the same output 16 at substantially the same time. This parallel feature is supported by providing separate AWGRs 34 at each input 12 that are separately connected to each output 16 and providing N input ORAMs 46 that can buffer optical packets received from multiple different inputs 12 at the same time.

Another notable characteristic is that the signaling used for buffering and scheduling the output of buffered optical packets from the ORAM 46 is retained locally in each individual optical packet output 16. This reduces or eliminates the need for global control or timing in the optical packet processor 8. The optical packet outputs 16 may also only need an N deep ORAM. This will be explained in more detail below.

Figure 3:
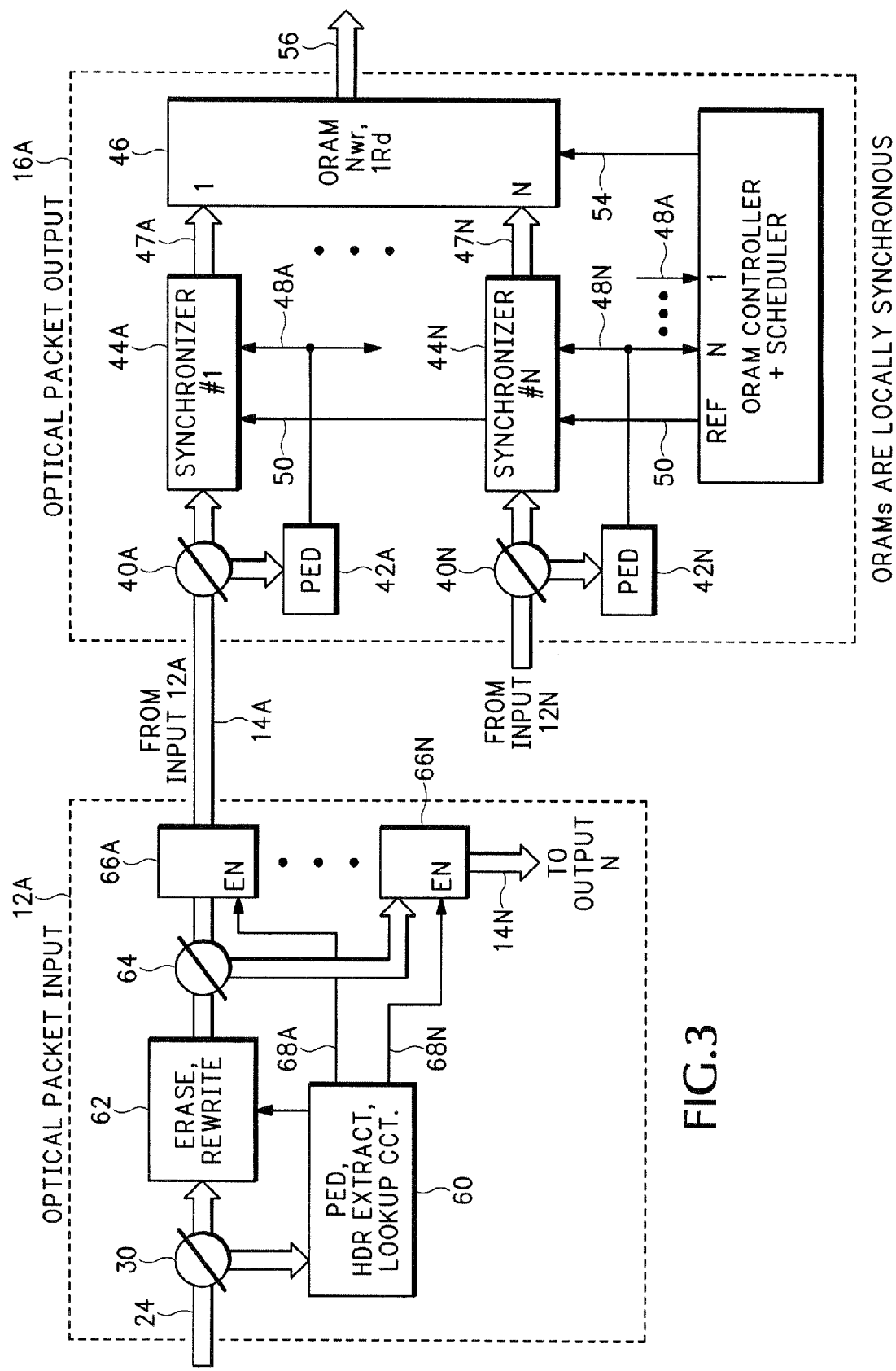
FIG. 3 is another embodiment of the output queued optical packet processing architecture shown in FIG. 1 that uses an optical splitter interconnect.

FIG. 3 shows an alternative embodiment of the optical packet inputs 12A-12N shown in FIG. 2. The input controller 60 includes the same Packet Envelope Detection (PED), header extraction, and destination look up operations described in FIG. 2. However, in this embodiment the input processor 62 does not include a FTWC for converting the received optical packets to a wavelength associated with a particular output 16.

Alternatively, the input processor 62 possibly only erases the optical packet header and rewrites a new header that contains information necessary to direct the optical packet to an identified destination. As an alternative to the FTWC and AWGR 34 in FIG. 2, the optical packet input 12 includes an optical packet splitter 64 that copies and directs the optical packet at the same wavelength to multiple optical gates 66A-66N.

The optical gates 66A-66N are coupled between the packet splitter 64 and each of the interconnects 14A-14N, respectively. The optical gates 66 are each selectively enabled according to the destination output 16 identified by the input controller 60. The input controller 60 activates an enable signal 68A-68N to one of the gates 66A-66N associated with the identified output 16. The optical packet is then directed through the enabled gate 66 and over the associated interconnect 14 to the identified optical packet output 16.

An important advantage of the architecture in FIG. 3, and in particular the use of optical packet splitter 64 combined with the control logic in input controller 60, is that optical packets can be multicast. The optical header detection and processing carried out by input controller 60 can determine, based on the optical header or other information, that a given optical packet needs to be sent to multiple destinations. Accordingly, all, or the desired subset of, the gates 66A-66N can be enabled to send the given optical packet to one or more outputs at the same time. The desired subset of the gates can be a function of the particular input port on which the optical packet arrived, can be a function of the optical input 12 as a whole, can be determined based on the optical header in the given optical packet, can be a function of state information determined from previous optical packets and maintained in input controller 60 or elsewhere, or can be determined by any combination of these factors.

This embodiment provides selective replication with an all-optical architecture without having to use FTWCs and AWGRs 34 (FIG. 2). Similar to FIG. 2, the architecture in FIG. 3 does not require global electronic signaling or clocking between the optical packet inputs 12 and optical packet outputs 16 or between different optical packet outputs 16.

Figure 4:
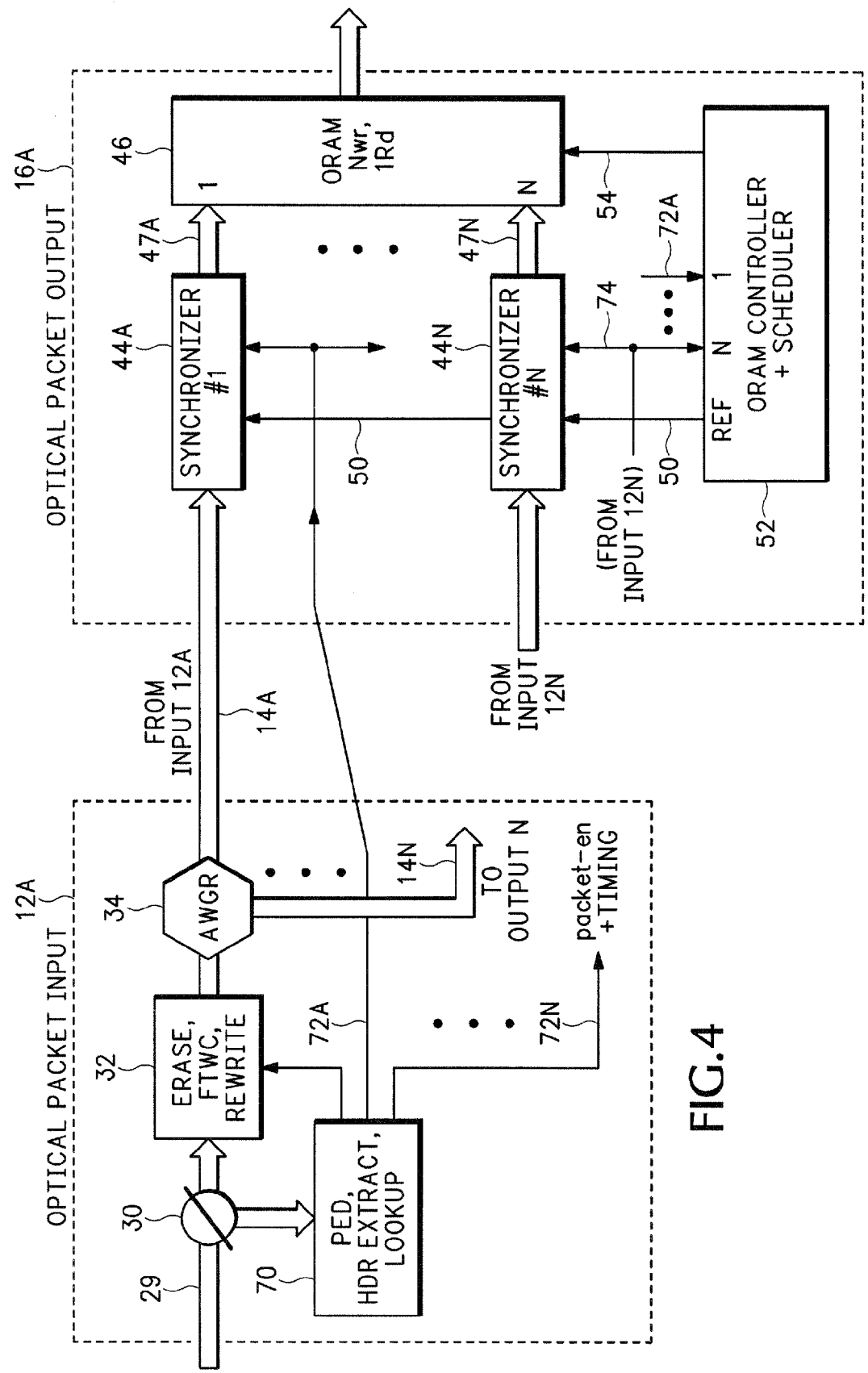
FIG. 4 is another embodiment of the output queued optical packet processing architecture shown in FIG. 2 that uses an input based packet detection circuit.

FIG. 4 shows an alternate embodiment of the output queued architecture where the input controller 70 provides distributed packet enable and asynchronous packet reference timing signals 72A-72N to each of the optical packet outputs 16A-16N, respectively. The packet detection indication (packet-en) and asynchronous reference time information 72 are sent to both the ORAM controller and scheduler 52 and to one of the synchronizers 44 in each of the optical packet outputs 16A-16N. Using the PED 70 in each optical packet input 12 to supply asynchronous optical packet detection and reference timing information 72 eliminates having to use individual PEDs 40 at each ORAM input 47. The asynchronous optical packet detection and reference time information for other inputs 12B-12N are also supplied to each output 16 and are represented by timing signal 74 sent by input 12N to synchronizer 44N.

Figure 5:
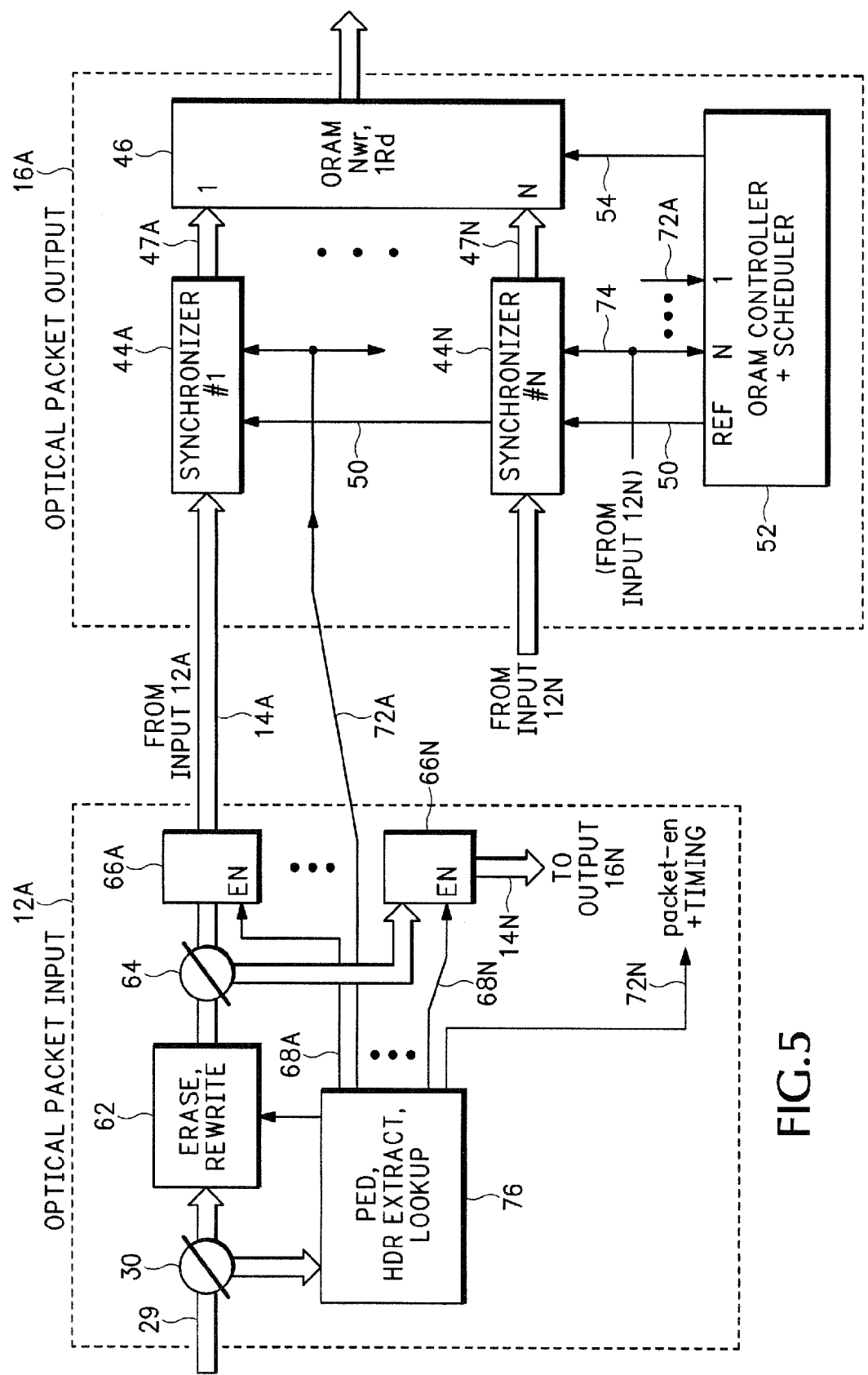
FIG. 5 is another embodiment of the output queued optical packet processing architecture shown in FIG. 3 that uses an input based packet detection circuit.

FIG. 5 shows another alternative embodiment that replaces the FTWC and AWGR 34 (FIG. 2) with an optical packet splitter 64 and selectively enabled optical gates 66. Similar to FIG. 4, the optical packet inputs 12 also provide the asynchronous optical packet detection and reference timing information 72A-72N to the synchronizers 44 in the different optical packet outputs 16A-16N, respectively. Thus, the architecture in FIG. 5 does not require FTWCs and AWGRs in the optical packet inputs 12 and also does not require PEDs 42 (FIG. 3) in the optical packet outputs 16.

In this embodiment, the PED in the input controller 76 detects asynchronous optical packets received on input 29 and conducts whatever header extraction and destination lookup operations may be necessary for directing the asynchronous optical packet to the correct optical packet outputs 16A-16N. Similar to FIG. 3, the header in the optical packet may be erased and rewritten by input processor 62 prior to being directed toward all of the optical packet outputs 16A-16B by optical splitter 64. The input controller 76 then uses enable signals 68A-68N to only enable the optical gate 66A-66N associated with the identified output 16.

At the same time, the input controller 76 also sends the asynchronous optical packet detection and reference timing information 72A-72N to a corresponding synchronizer 44 and the output controller 52 in each of the respective optical packet outputs 16A-16N. The synchronizer 44 associated with the interconnect 14 for the enabled gate 66A-66N synchronizes the received asynchronous optical packet with the ORAM 46. The output controller 52 then writes the now synchronized optical packet into an associated input 47 of ORAM 46.

Figure 6:
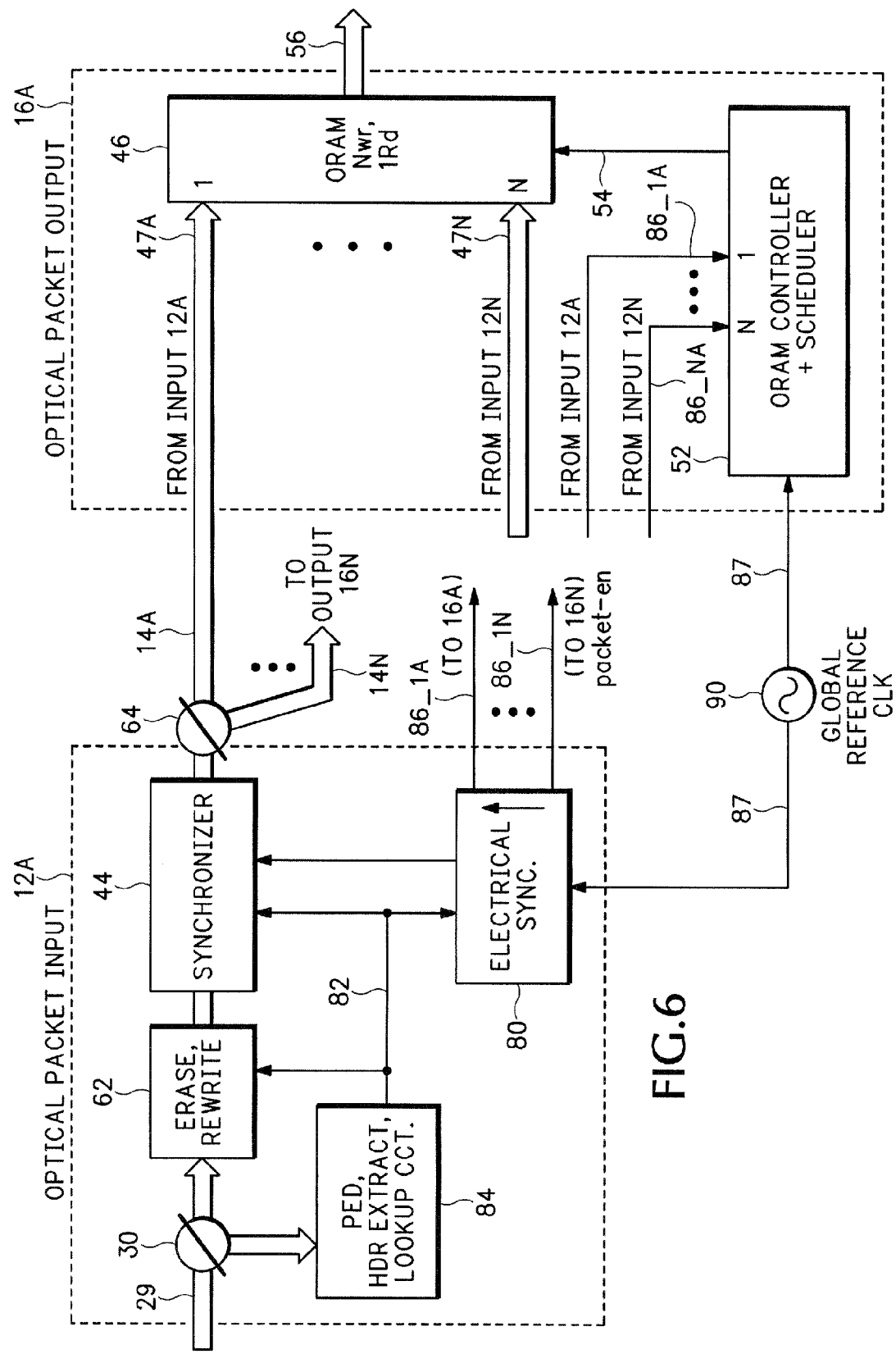
FIG. 6 is another embodiment of the output queued optical packet processing architecture shown in FIG. 1 that uses a global reference clock.

FIG. 6 shows yet another embodiment that uses a global reference clock 90 to further reduce the number of optical processing elements. In FIG. 6, the synchronizers 44 are all moved from the optical packet outputs 16 to the optical packet inputs 12. The input controller 84 conducts the same asynchronous optical packet detection, header extraction and packet look up described above. Further, the input processor 62 performs the same optical header erasing and rewriting described above.

However, the input processor 62 is now connected directly to a synchronizer 44 located in the optical packet input 12. The synchronizer 44 operates similarly to the synchronizers previously provided in the outputs 16 but now receives the asynchronous optical packet detection and reference timing information 82 locally from the input controller 84. The ORAM timing information is provided globally by a global reference clock 90. This is different from the earlier embodiments where the ORAM reference time information 50 was local for each optical packet output 16.

The global reference clock 90 provides the global reference timing to both an electrical synchronizer 80 and the synchronizer 44 in each optical packet input 12, and to the output controller 52 in each optical packet output 16. The use of the word "clock" should not be considered limiting, as the global reference clock 90 could be any form of electrical or optical signaling that serves to provide a periodic time reference to the optical packet inputs and outputs. The global reference clock 90 could be a fixed or variable frequency clock, such as one operating at 100 MHz or 1 GHz. Alternatively, the global reference clock 90 could be a periodic pulse at a lower frequency which is sampled by high-speed logic at each point desiring global synchronization.

The optical packet synchronizer 44 synchronizes the asynchronously received optical packets with the phase of the global reference clock 90 and then outputs the synchronized optical packets to an optical packet splitter 64. In this embodiment, the optical packet is then directed synchronously over the interconnect 14 to each one of the optical packet outputs 16A-16N.

The electrical synchronizer 80 synchronizes the asynchronous optical packet detection signal 82 with the associated, and now synchronized, optical packets that are sent over the interconnect 14 to the ORAM 46. The electrical synchronizer 80 sends the synchronized asynchronous optical packet detection signals 86_1A-86_1N to the output controllers 52 in associated optical packet outputs 16A-16N.

The output controller 52 uses the synchronized packet enable signal 86_1A from input 12A as well as any other packet enable signals 86_2A-86_NA received from the other inputs 12B-12N to enable writing of the synchronized optical packets into ORAM 46. For example, the output controller 52 may only enable writes for inputs 47A-47N having associated active packet enable signals 86_1A-86_NA. The output controller 52 also schedules when optical packets are read out of ORAM 46. This embodiment eliminates the FTWCs and AWGRs and also reduces the number of required PEDs and optical synchronizers.

All of the embodiments shown in FIGS. 1-6 further have the substantial advantage of reducing the amount of required buffering by locating the ORAM 46 at the outputs 16 and allowing the ORAMs 46 to receive optical packets from all N optical packet inputs 12A-12N at the same time. Providing N packets of buffering in ORAM 46 provides sufficient storage to hold at least one arriving packet from each input 12A-12N.

If desired, a global controller may track how much data is present at each output 16 or received from each input 12 and is still present at some output 16. The global controller or local output controllers 52 can then decide which new optical data is stored or dropped if the output buffer 46 runs out of space. The optical packet drop strategies can depend on many factors, such as the history of drops for the various inputs 12, current occupancy of a local ORAM 46 or the occupancy of other output buffers, etc. If cost effective, the size of the ORAMs 46 can of course be increased beyond N to further minimize drops. The size of ORAM 46 can also be less than N, with the understanding that all inputs 12A-12N converging on one output 16 might not be handled, even if the output is currently empty.

Figure 7:
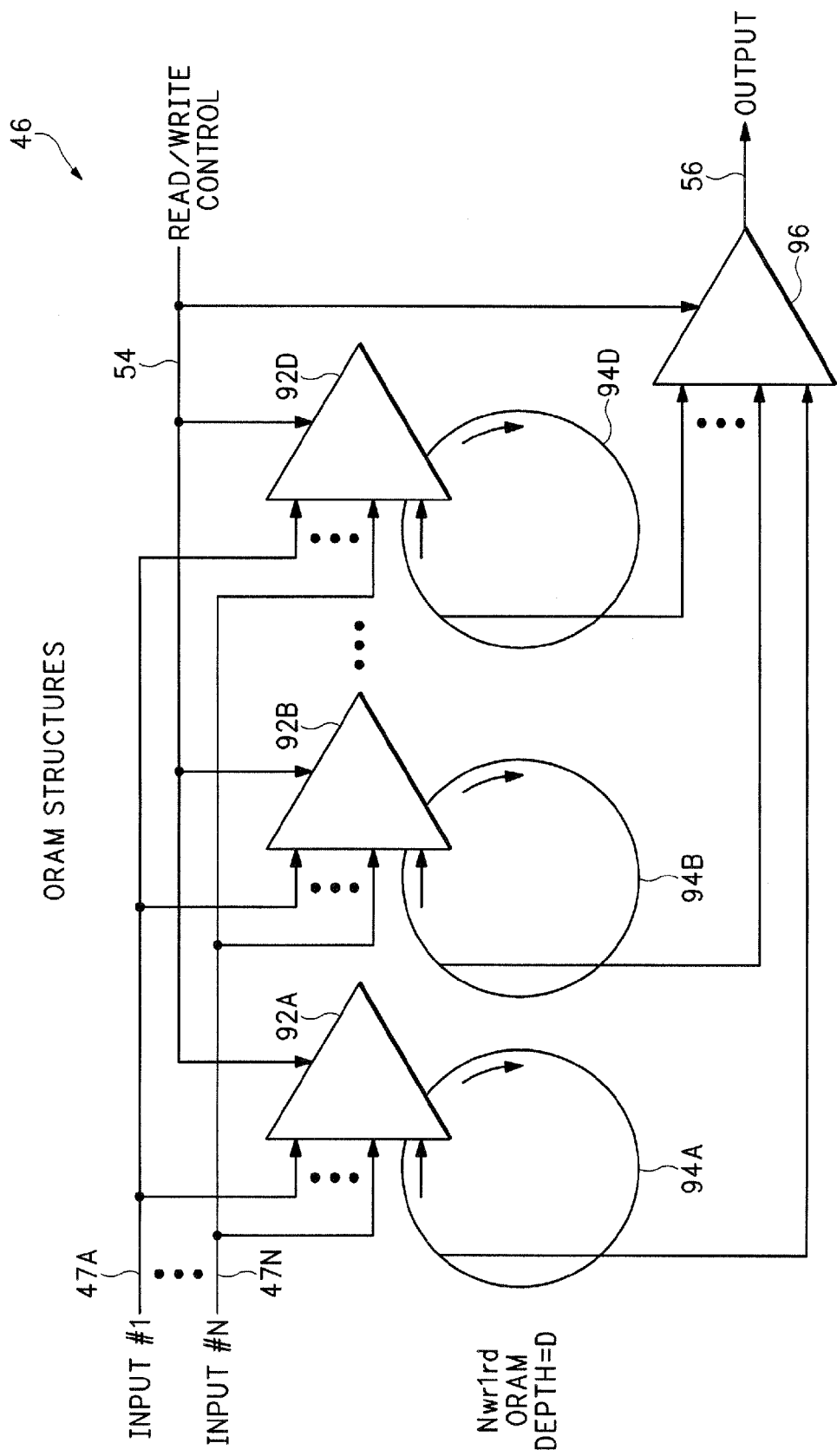
FIG. 7 shows one example of a multiple input/single output Optical Random Access Memory (ORAM) that may be used in different optical packet architectures.

FIG. 7 shows one example of the N write/1 read ORAM 46 shown above that has a depth of D. In this example, the ORAM 46 includes N inputs 47A-47N that are each connected to input optical multiplexers 92A-92D. Each input multiplexer 92A-92D has an associated optical waveguide storage element or "loop" 94A-94D that "stores" the received optical packets for some fixed time period by directing the optical packet through a waveguide path. Each of the optical storage elements 94A-94D is also connected to an optical output multiplexer 96.

Read and write control signals and addressing on control line(s) 54 are received from the output controller 52 described above. A write signal and address on control line(s) 54 causes the input multiplexers 92A-92D to write the optical packets into associated storage elements 94A-94D. A read signal and address on control line(s) 54 causes output multiplexer 96 to read an optical packet from one of the associated storage elements 94.

It is important to remember that this is just one example of an optical memory device that could be used in any of the optical packet processing architectures described above. Other optical packet buffering devices could also be used. Further, the number of optical storage elements 94 can vary depending on storage requirements.

Distributed Output Queuing

Figure 8:
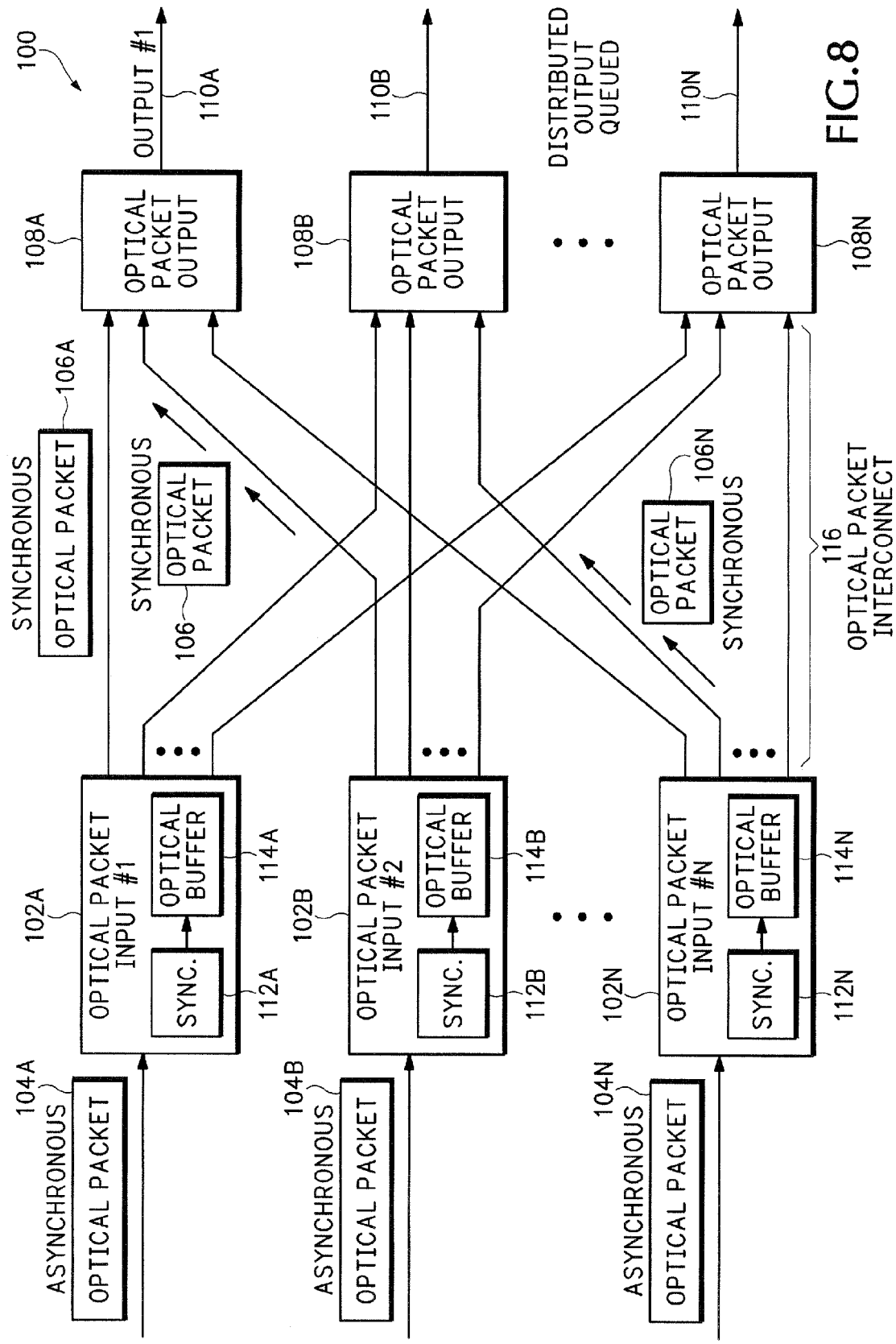
FIG. 8 is a block diagram of a distributed output queued optical packet processing architecture.

FIG. 8 shows an optical packet processor 100 that uses a distributed output queued architecture. In this embodiment, optical buffers 114, as well as the associated synchronizers 112, are located in the optical packet inputs 102A-102N. This is different than the architecture described above where the optical buffers were typically located in the optical packet outputs 16. This distributed optical output queuing architecture can simplify the structure of the optical packet output 108 and can also use less complex 2-port (one write, one read) ORAMs.

A more complex ORAM with multiple read ports could also be used to allow multiple optical packets to be sent over the optical packet interconnect 116 at the same time. While the point-to-point optical packet interconnect 116 shown in FIG. 8 may not fully take advantage of this ability, an alternative crossbar style of interconnect could. Such an embodiment could reduce the total number of optical links inside the optical router, at the cost of adding a separate crossbar stage to the optical router. A crossbar interconnect with, for example, $j_i$ links from each input to the crossbar, and $j_o$ links from the crossbar to each output, is within the scope of this invention. Of course, if $j_o$ is greater than 1, then there may be a requirement to add buffering at the optical outputs, as in FIGS. 2-6, since they could receive more than one optical packet at a time.

The optical packet inputs 102A-102N each receive asynchronous optical packets 104A-104N, respectively, from an optical packet network. Again, the optical packet inputs 102 can be input line cards that connect directly with the optical network or can be input ports or internal input interfaces located internally in a larger optical packet processing system. Similarly, the outputs 108A-108N may be connected directly to the optical network or may be internal ports or interfaces in the packet processing system.

The asynchronous optical packets 104 are synchronized prior to being stored in the optical buffers 114. The synchronized and buffered optical packets 106 are then directed over the optical packet interconnect 116 to the optical packet outputs 108. The optical packet outputs 108A-108N then output the synchronized optical packets 106 received over interconnect 116 over different output ports 110A-110N, respectively. There are several different embodiments of the optical packet outputs 108. In one embodiment, a single optical packet output element may be used for all output ports 110A-110N. Alternatively, there may be a separate line card or optical output element associated with each output port 110A-110N. As also described above with respect to FIG. 1, the number of inputs and outputs is represented by the variable N. The number N can vary for different applications and the number of inputs could be different than the number of outputs.

Figure 9:
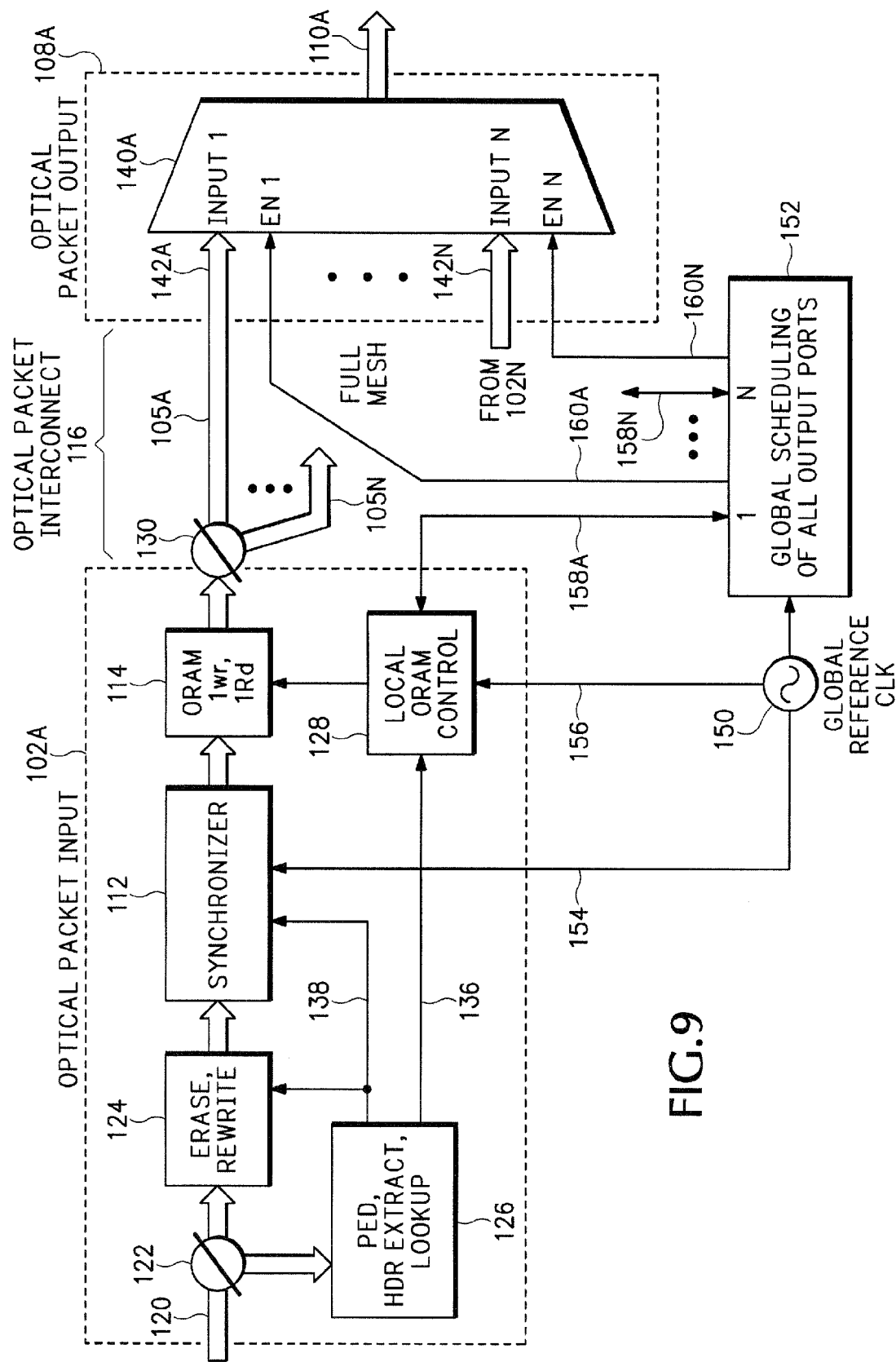
FIG. 9 is one embodiment of the distributed optical packet architecture that uses an optical packet splitter and an optical packet multiplexer interconnect.

FIG. 9 shows one embodiment of the optical packet processor 100 shown in FIG. 8. In this embodiment, the optical packet inputs 102 each include one input port 120 that receives the asynchronous optical packets. An optical packet splitter 122, input controller 126, and input processor 124 all operate similarly to any of the embodiments discussed above in FIGS. 2-6.

However, the optical packet inputs 102 now also include ORAMs 114 that provide buffering prior to outputting the optical packets from output 108. Of course, and as explained with respect to the crossbar style of optical packet interconnect, nothing precludes additional optical buffering at the optical packet outputs. The ORAM 114 has an associated synchronizer 112 that synchronizes the asynchronous packets 104 (FIG. 8) with the timing parameters used by ORAM 114.

Another aspect of the architecture shown in FIG. 9 is that a same global reference clock 150 is used for the ORAMs 114 in all of the different optical packet inputs 102A-102N, respectively. The same global reference clock 150 is also used accordingly by synchronizer 112 to synchronize the asynchronous optical packets with the phase of ORAM 114. This effectively synchronizes the packets output from ORAM 114 with the optical packets output from the other ORAMs 114 located in other associated optical packet inputs 102B-102N.

A local ORAM controller 128 determines when the ORAM 114 writes and reads optical packets according to both the global reference clock 150, packet detection signals 136 received from the input controller 126, and control signaling 158A from a global scheduler 152. The control signaling 158A sent from local ORAM controller 128 to global scheduler 152 may include information regarding the contents of ORAM 114. This packet detection information is used by the global scheduler 152 to both determine which inputs 102A-102N have received optical packets and further determine which inputs to enable in the optical packet outputs 108.

In this example, the interconnect 116 comprises an optical packet splitter 130 that outputs the same optical packets from ORAM 114 to the first input 142A in each one of N different optical packet outputs 108A-108N (FIG. 8). The optical packet outputs 108 each include an optical packet multiplexer 140 having inputs 142A-142N that each receive optical packets from one of the optical packet inputs 102A-102N, respectively. The global scheduler 152 generates a set of global output enable signals 160A-160N for each multiplexer 140 that selects which optical packet on inputs 142A-142N is directed to output 110.

This distributed output queued architecture requires only one PED in input controller 126 and one synchronizer 112 for each optical packet input 102. The optical packet inputs 102 also do not require any FTWCs or AWGRs. Further, single input/single output ORAMs can be used to buffer optical packets.

Figure 10:
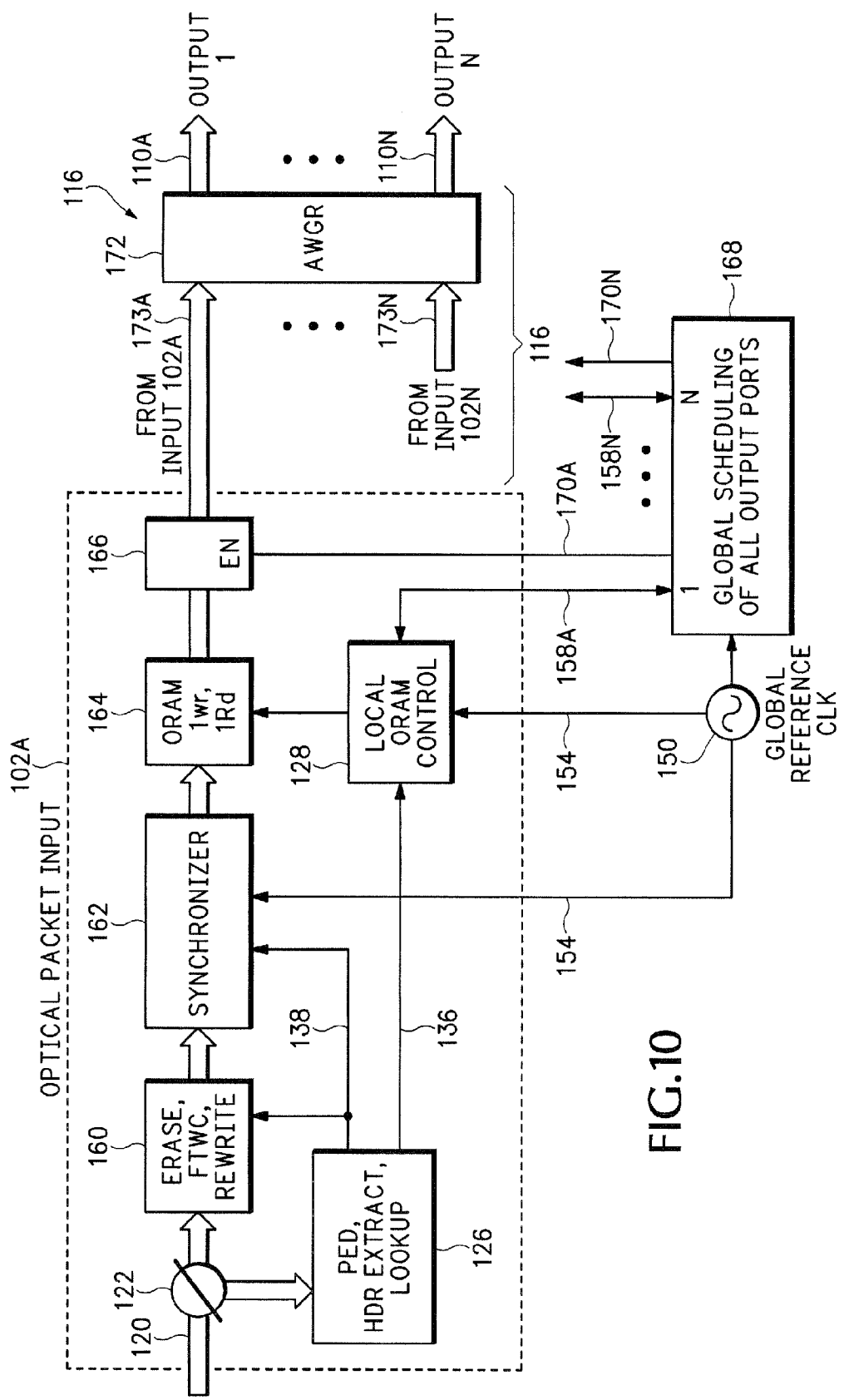
FIG. 10 is another embodiment of the distributed optical packet architecture that uses optical gates and an Array Waveguide Grating Router (AWGR) interconnect.

FIG. 10 shows an alternative embodiment of the distributed output queue architecture where all packet buffering and scheduling is controlled by a global controller and scheduler 168. In this embodiment, the input processor 160 includes an FTWC that varies the optical packet wavelength according to the destination output 110A-110N identified by the input controller 126.

The input processor 160 converts the asynchronous optical packets to the particular optical wavelength associated with the identified output port 110. The synchronizer 162 delays the optical packet according to both the detected asynchronous reference time detected by input controller 126 and the global reference time 154 generated by global reference clock 150. The ORAM 164 is configured to store optical packets at any of the different optical wavelengths output by the FTWC in input processor 160. The global controller 168 then schedules when ORAM 164 reads out the synchronized optical packets. The output of each ORAM 164 includes an optical gate 166 that is selectively enabled by the global controller 168 to prevent unintentionally sending data to the outputs.

The interconnect 116 in this example is a relatively simple AWGR 172 that operates in a manner similar to a cross-bar switch. As described above, the optical packets received from the inputs 102A-102N may have different optical wavelengths associated with different output ports 110A-110N. Accordingly, the global controller 168 for each global clock period only directs one packet at each of the associated output wavelengths to each of the inputs 173A-173N of AWGR 172. The AWGR 172 automatically directs all of the optical packets presented at inputs 173A-173B to the outputs 110A-110N associated with their optical wavelengths and ports.

For example, an optical packet may be directed from optical packet input 102A to input 173A of AWGR 172 with an optical wavelength of kD. The AWGR 172 accordingly directs the optical packet to an output port 110D (not shown).

At the same time an optical packet may be directed from optical packet input 102N to input 173N of AWGR 172 with an optical wavelength of $\lambda_A$. Note that $\lambda_A$ may be directed by the AWGR 172 to different output ports according to the input port. The AWGR 172 in this example directs the optical packet to output port 110A. This embodiment reduces some of the complexity of the optical packet interconnect 116 while also removing any global control signaling from the optical packet output 108.

Figure 11:
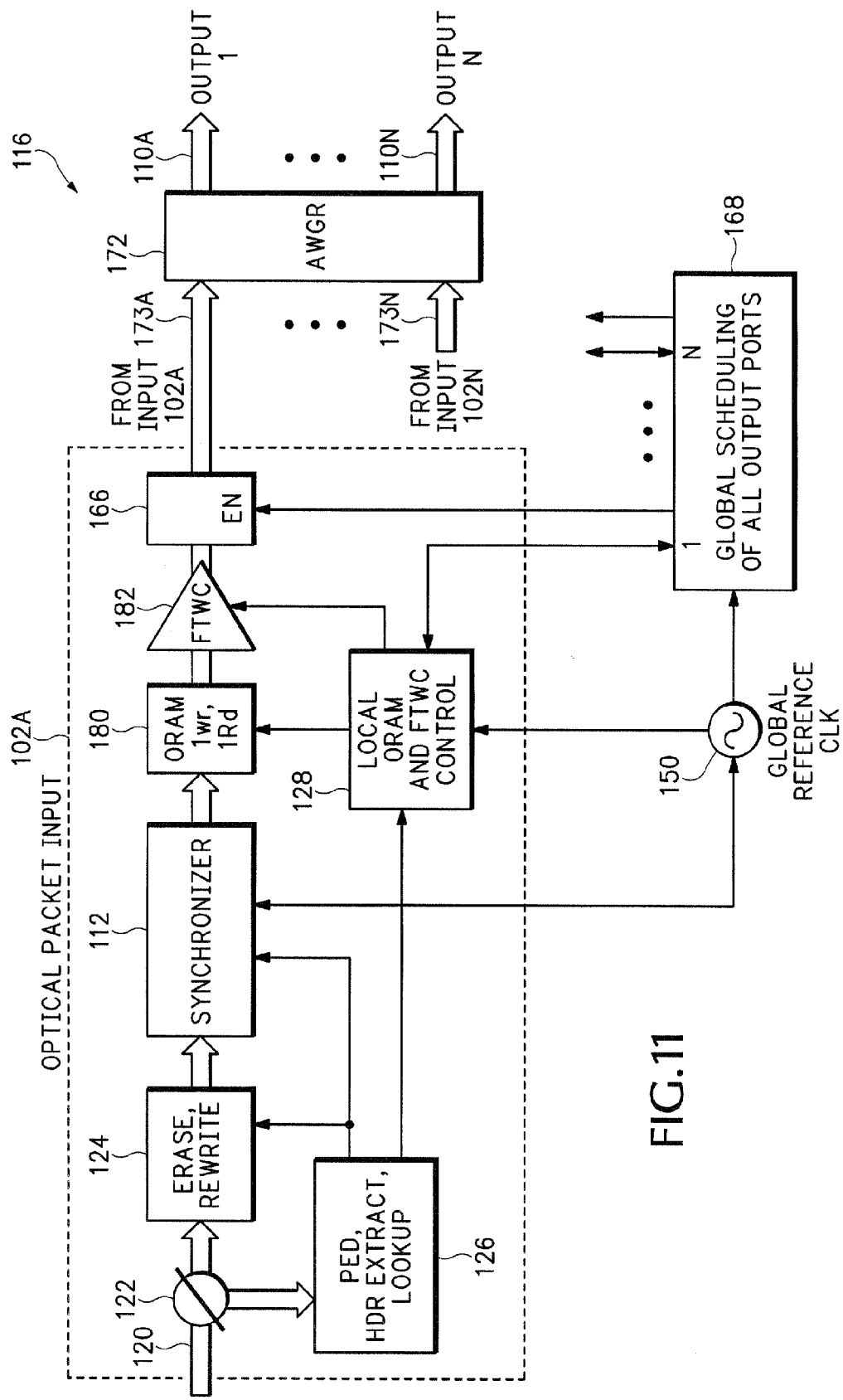
FIG. 11 is another embodiment of the distributed optical packet architecture shown in FIG. 10 that uses a Fast Tunable Wavelength Converter (FTWC) after optical buffering.

FIG. 11 shows a configuration similar to FIG. 10. However, in this embodiment the FTWC 182 is connected to the output of the ORAM 180. This allows use of ORAMs 180 that only require operation at a single optical wavelength. The local ORAM controller 128 stores the optical wavelength values associated with the destination output port 110 identified by the input controller 126. The local ORAM controller 128 then controls which optical wavelength values are used by the FTWC 182 when converting the wavelength for the optical packets output from the ORAM 180. Similar to FIG. 10, the global controller 168 determines which optical packets from which inputs 102 are output each global clock cycle to the AWGR 172. The AWGR 172 then automatically directs the optical packets at inputs 173 to the output ports 110 associated with the converted wavelengths generated by FTWC 182.

Distributed output queuing may use roughly N+k−1 storage at each optical packet input 102 (FIG. 8). The reason for the '1' is that even when the queue at one input 102 is filled with optical packets (k) all directed to a same output, it would be desirable not to have to drop the next N−1 received packets that are destined for other outputs. These additional optical packets can not be stored without separate space until the previous k optical packets drain. However, only one of the k packets may drain every N'th cycle as a typical scheduler round-robins each of the N inputs 102 to the congested output. Of course, other embodiments of schedulers may serve the inputs in some different fashion, and these computations would change in accordance with the properties of the specific scheduler.

Output queuing as shown above in FIGS. 2-6 can operate with just N storage at each output 16. However this requires an N×1 (N write, 1 read) ORAM that provides N write inputs and 1 read output (see FIG. 7). The distributed output queuing shown in FIGS. 8-11 only requires a 1×1 (1 write, 1 read) ORAM that has 1 write input and one 1 read output (see FIGS. 12 and 13) but may use roughly N+k−1 of storage space to achieve the same guarantee of holding k packets from an input destined to one output without dropping other traffic. The distributed output queued embodiments may use the FIFO type ORAM shown below in FIG. 12 or the random read/write ORAM shown below in FIG. 13.

Optical Buffers

Figure 12:
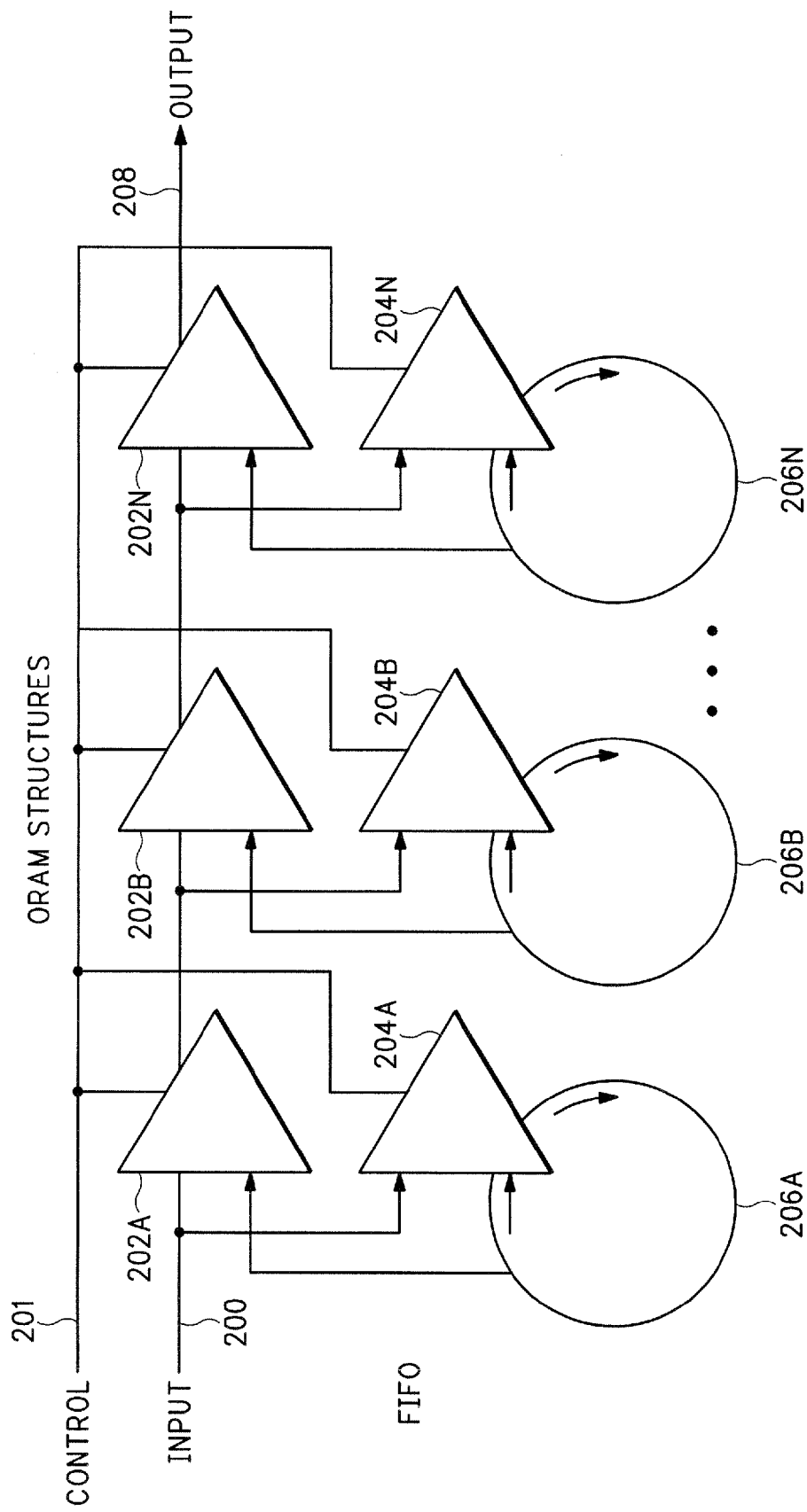
FIG. 12 shows one example of an optical First In First Out (FIFO) buffer that may be used in the different optical packet architectures.

FIG. 12 shows one example of an optical First In First Out (FIFO) type buffer that may be used to implement the ORAMs in the distributed output queuing schemes shown in FIGS. 8-11. An input 200 is coupled to an output 208 through multiple storage elements 206A-206N. Writing to and reading from the storage elements 206A-206N is controlled through associated sets of multiplexers 202A/204A-202N/204N, respectively. The multiplexers 202A/204A-202N/204N are controlled by any combination of local and/or global clock and control signals 201 as described above. This is just one example and it should be understood that alternative buffering arrangements could also be used.

Figure 13:
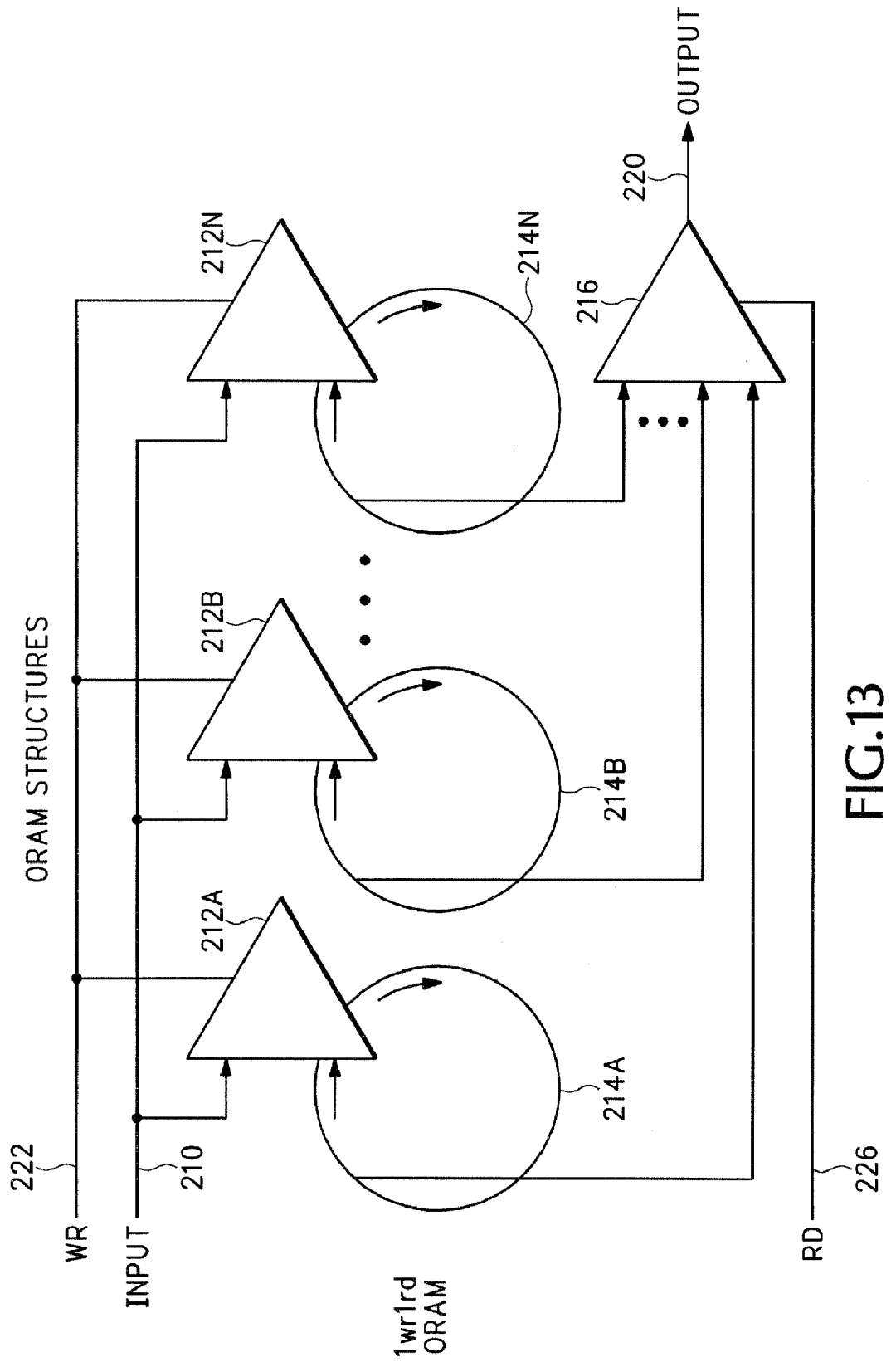
FIG. 13 shows one example of a one input/one output Optical Random Access Memory (ORAM) that may be used in the different optical packet architectures.

FIG. 13 shows one example of an alternative 1 write (1wr)/1 read (1rd) ORAM. The optical packet received on input 210 is selectively coupled to different optical storage elements 214A-214N by optical multiplexers 212A-212N controlled by a write signal 222. Any of the optical packets contained in storage elements 214A-214N can then be randomly directed to output 220 through an optical multiplexer 216 controlled by a read signal 226.

As also explained above in FIG. 7, the optical storage elements 206 in FIG. 12 and optical storage elements 214 in FIG. 13 are shown as optical loops. However, any type of optical storage device can be used. It should also be understood that any number of optical storage elements can be used in the ORAMs according to the particular application and design requirements.

Global Control

Traditional electronic based input-queued packet processing architectures may use a N*k (outputs*depth) sized buffer at each input ($N^2$*k storage total). This could be costly in optical packet processors. Thus, some of the output queuing schemes described above may advantageously use a size k buffer (N*k storage total). A smaller buffer size of N*(N+k−1) can also be achieved with input queuing by using global control such as distributed output queuing that provides global knowledge of the occupancy of all input queues. For example, output queuing can be emulated at the inputs with knowledge of how many optical packets are destined for each output. This global tracking can prevent the optical processor as a whole from having more than k optical packets destined to the same output. Global knowledge also ensures that no single output takes so many slots at a given input such that there are less than N−1 slots available for other outputs. Since the ORAM can be expensive, the resulting optical router is cheaper.

Global control may not scale as well in distributed packet processing schemes. Therefore, global control may be dismissed from consideration in traditional, all-electrical, packet processing systems. Because the cost tradeoffs are different for optical packet processing architectures, distributed control may be a more attractive alternative.

Alternate Embodiments

The systems described above can process single priority optical traffic. Alternatively, optical labels can be attached to each optical packet that may encode an associated priority. Duplicate optical buffers can then be used for priority and non-priority traffic. The optical buffer duplication could be physical or virtual in a similar fashion to the distributed output queuing described above that tracks the amount of priority vs. non-priority optical data at each input along with appropriate changes to the electrical control signals.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. An optical packet processor, comprising:
multiple optical packet inputs to receive asynchronous optical packets;
multiple optical packet outputs to output the optical packets;
an optical packet interconnect that connects the optical packet inputs to the optical packet outputs;
multiple optical packet buffers to buffer the optical packets prior to be being output from the different optical packet outputs; and
multiple optical packet synchronizers to operate independently of each other and receive a periodic clock signal signals having a series of successive clock periods corresponding to one or more phases of the optical packet buffers, wherein the optical packet synchronizers are configured to synchronize the asynchronous optical packets by aligning each of the optical packets with a different one of the successive clock periods based on differences between the clock periods in the periodic clock signal and the corresponding phases of the optical packets, wherein the multiple optical packet synchronizers are configured to output synchronized optical packets to corresponding inputs of multiple optical packet buffers, and wherein the multiple optical packet buffers are configured to receive one or more scheduling signals from corresponding optical buffer controllers and output the buffered optical packets responsive to the one or more scheduling signals.

2. The optical packet processor according to claim 1 wherein the asynchronous optical packets are asynchronously directed from the inputs over the optical packet interconnect to the outputs and the synchronizers and optical packet buffers are located in the outputs.

3. The optical packet processor according to claim 2 wherein at least some of the optical packet buffers include multiple different inputs each coupled to individual synchronizers that each operate independently of the other synchronizers coupled to the other inputs of the same optical packet buffers and that each synchronize received asynchronous packets on the same inputs with the clock signals for the associated optical packet buffers.

4. The optical packet processor according to claim 3 including optical packet detectors associated with each of the individual synchronizers that detect when the asynchronous optical packets are received from the optical packet interconnect and further identify asynchronous packet reference times used by the associated synchronizers for synchronizing the asynchronous packets with the optical packet buffers.

5. The optical packet processor according to claim 2 wherein the optical buffers and synchronizers located in the outputs use local timing and local control signaling independent of the timing and control signaling used in other outputs and inputs for synchronizing the asynchronous packets with the optical buffers.

6. The optical packet processor according to claim 1 including input controllers located in the inputs that detect the asynchronous optical packets and control how the optical packet interconnect directs the asynchronous optical packets to the different outputs.

7. The optical packet processor according to claim 6 wherein the input controllers include a packet detector that provides asynchronous packet reference times to synchronizers located in the outputs for synchronizing the asynchronous optical packets received over the optical packet interconnect with the optical buffers.

8. The optical packet processor according to claim 1 including:
an optical cross-bar interconnect shared between the different inputs;
input controllers located in the different inputs that detect the asynchronous optical packets; and
a global controller that schedules the sending of optical packets from the different inputs over the shared optical cross-bar interconnect according to the asynchronous optical packet detections from the inputs controllers in the different inputs.

9. The optical packet processor according to claim 1 including:
wavelength converters located in the inputs that convert the optical packets to optical wavelengths associated with the different outputs; and
Array Waveguide Grating Routers (AWGRs) used in the optical packet interconnect to direct the asynchronous optical packets to the outputs associated with the converted optical wavelengths.

10. The optical packet processor according to claim 1 including:
optical packet splitters configured to copy the same asynchronous optical packets to optical interconnections coupled to each one of the outputs; and
multiple different optical gates each associated with a different output and coupled between the optical packet splitters and the optical interconnection; and
input controllers identifying the outputs associated with the asynchronous optical packets and enabling the optical gates associated with the identified outputs.

11. The optical packet processor according to claim 1 including:
a global scheduler that controls the output of the optical packets contained in optical buffers located in the inputs;
a wavelength converter that converts the optical packets in the inputs into different wavelengths according to associated outputs; and
an optical cross-bar switch that directs the optical packets from the inputs to different outputs according to the converted wavelengths.

12. The optical packet processor according to claim 1 including:
a global reference clock used for synchronizing the optical buffers associated with multiple different outputs; and
an optical packet synchronizer located in each input that synchronizes the asynchronous optical packets with the global reference clock prior to sending the optical packets over the optical packet interconnect to the outputs.

13. The optical packet processor according to claim 1 wherein the optical buffers and the synchronizers are located in the inputs and the synchronizers synchronize the asynchronous optical packets with the optical buffers prior to the optical packets being buffered in the optical buffers.

14. The optical packet processor according to claim 13 including optical packet multiplexers associated with the different outputs that selectively output the optical packets received from the optical buffers according to global enable signals.

15. The optical packet processor according to claim 14 wherein the optical packet interconnect is an optical packet splitter that directs the optical packets from the same optical buffers to the optical packet multiplexers associated with each of the different outputs.

16. The optical packet processor according to claim 13 including:
an input controller that identifies outputs associated with the received asynchronous optical packets and identifies optical wavelengths associated with the identified outputs;
Fast Tunable Wavelength Converters (FTWCs) associated with the inputs that convert the asynchronous optical packets to the optical wavelengths associated with the identified outputs;
optical packet gates that selectively direct the buffered optical packets to the optical packet interconnects associated with different outputs; and
Array Waveguide Grating Routers (AWGRs) that direct the optical packets from the optical packet gates to the different outputs according to their converted optical wavelengths.

17. The optical packet processor according to claim 16 wherein the FTWCs are located between the optical buffers and the optical packet gates.

18. The optical packet processor according to claim 13 wherein the optical buffers and synchronizers located in the inputs use local timing and local control signaling independent of the timing and control signaling used in other outputs and inputs for synchronizing the asynchronous packets with the optical buffers.

19. A method for processing optical packets, comprising:
receiving optical packets with one or more different inputs;
directing the optical packets from the different inputs to one or more different outputs;
buffering the optical packets in optical buffers either prior to or after directing the optical packets from the inputs to the different outputs;
receiving a periodic clock signal having a series of successive clock periods corresponding to one or more phases of the optical buffers;
synchronizing the optical packets, prior to receiving the optical packets at inputs of the optical buffers and prior to buffering the optical packets in the optical buffers, by aligning each of the optical packets with a different one of the successive clock periods based on differences between the clock periods in the periodic clock signal and the corresponding phases of the optical packets;
receiving one or more scheduling signals from at least one optical buffer controller; and
outputting the buffered optical packets responsive to the one or more scheduling signals.

20. The method according to claim 19 including:
locating the optical buffers in the different outputs;
receiving optical packets at the different inputs;
identifying an associated destination for the optical packets;
asynchronously directing the optical packets to the outputs associated with the identified destination;
synchronizing the optical packets with the optical buffers;
buffering the synchronized optical packets in the optical buffers; and
scheduling outputting of the buffered optical packets from the optical buffers.

21. The method according to claim 19 including:
locally at each output synchronizing the optical packets with local optical buffers located in the same outputs independently of the inputs or the other outputs; and
locally scheduling the reading of the synchronized optical packets from the local optical buffers independently of the other outputs.

22. The method according to claim 19 including:
identifying asynchronous packet reference times for the optical packets received at the different inputs; and
sending the identified asynchronous packet reference times to the outputs for synchronizing the optical packets with the optical buffers.

23. The method according to claim 22 including:
generating a global reference time associated with the optical buffers at multiple different outputs; and
using the global reference time and the identified asynchronous packet reference times to synchronize the optical packets with the optical buffers.

24. The method according to claim 19 including:
identifying outputs for the optical packets received at the inputs;
converting the optical packets into optical wavelengths associated with the identified outputs; and
directing the optical packets to the different outputs according to the converted optical wavelengths.

25. The method according to claim 19 including:
identifying the outputs associated with the optical packets received at the inputs optically copying and directing the copied optical packets from the same inputs to multiple different optical gates each associated with a different one of the outputs; and
enabling the optical gates associated with the identified outputs.

26. The method according to claim 25 including multicasting the optical packets by enabling multiple gates from the same input to send the same optical packet to multiple different outputs at the same time.

27. The method according to claim 19 including:
synchronizing the optical packets received at the inputs with an optical buffer located in the inputs; and
buffering the synchronized optical packets at the inputs with the optical buffer in the input.

28. The method according to claim 27 including:
identifying outputs associated with the received optical packets;
optically copying the optical packets output from the optical buffers for sending to multiple different associated outputs; and
selectively directing a desired subset of the copied optical packets to the identified outputs.

29. The method according to claim 27 including:
identifying outputs associated with the received optical packets;
synchronizing the converted optical packets with associated optical buffers;
buffering the synchronized optical packets;
converting the optical packets into different optical frequencies associated with the identified outputs either before or after buffering the optical packets;
selectively enabling output of the buffered optical packets at the converted optical frequencies to the outputs; and
directing the enabled optical packets to the associated identified outputs according to the converted frequencies.

30. The method according to claim 19 including:
generating a global reference clock referenced by all of the optical buffers located in each of the different inputs or outputs; and
synchronizing optical packets with the global reference clock prior to buffering the optical packets in the optical buffers.

31. The method according to claim 26 including globally scheduling the outputting of the synchronized optical packets from the optical buffers to the different outputs.

32. The method according to claim 31 including:
globally tracking how many optical packets are buffered at the different inputs and which outputs are associated with the buffered packets; and
globally scheduling the outputting of the buffered packets from the different inputs to the different outputs according to the global tracking.

33. A system for processing optical packets, comprising:
means for receiving optical packets at one or more different inputs;
means for directing the optical packets from the different inputs to one or more different outputs;
means for buffering the optical packets in optical buffers either prior to or after directing the optical packets from the inputs to the different outputs;
means for receiving a periodic clock signal having a series of successive clock periods corresponding to one or more phases of the optical buffers; and
means for synchronizing the optical packets, prior to buffering the optical packets in the optical buffers on different optical buffer inputs, by aligning each of the optical packets with a different one of the successive clock periods based on differences between the clock periods in the periodic clock signal and the corresponding phases of the optical packets, wherein the means for synchronizing is configured to synchronize the optical packets independently of the optical packets received on other optical packet inputs for the same optical buffers, and wherein the means for buffering is configured to receive one or more scheduling signals from corresponding optical buffer controllers and output the buffered optical packets responsive to the one or more scheduling signals.

34. The system according to claim 33 including:
means for receiving optical packets at the different inputs;
means for identifying an associated destination for the optical packets;
means for asynchronously directing the optical packets to the outputs associated with the identified destination;
means for synchronizing the optical packets with the optical buffers;
means for buffering the synchronized optical packets in the optical buffers; and
means for scheduling outputting of the buffered optical packets from the optical buffers.

35. The system according to claim 34 including:
means for synchronizing the optical packets received at the inputs with an optical buffer located in the input; and
means for buffering the synchronized optical packets at the inputs with the optical buffer in the input.

\* \* \* \* \*